J. McC. MERIWETHER.
Cotton-Gins.
No. 204,443. Patented June 4, 1878.
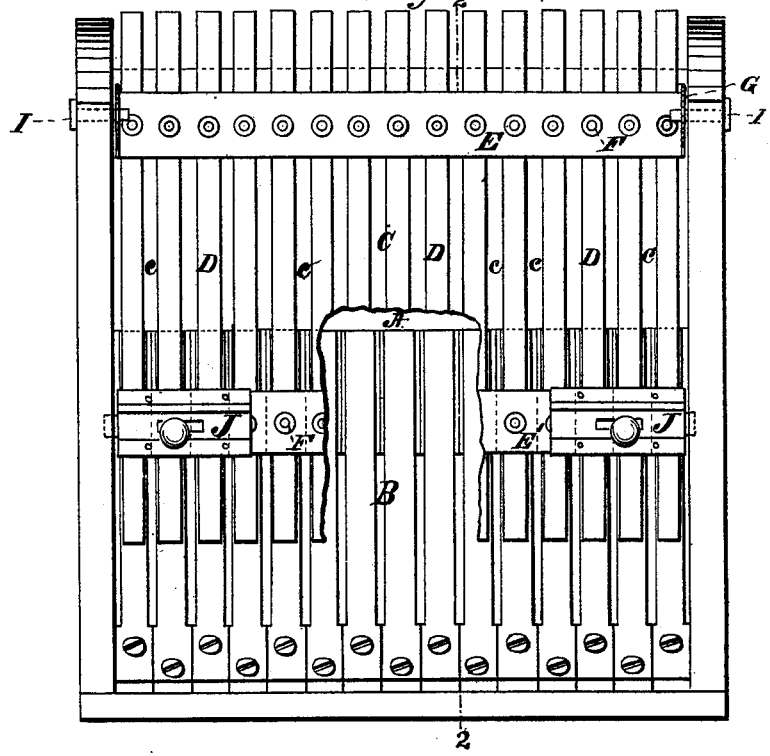
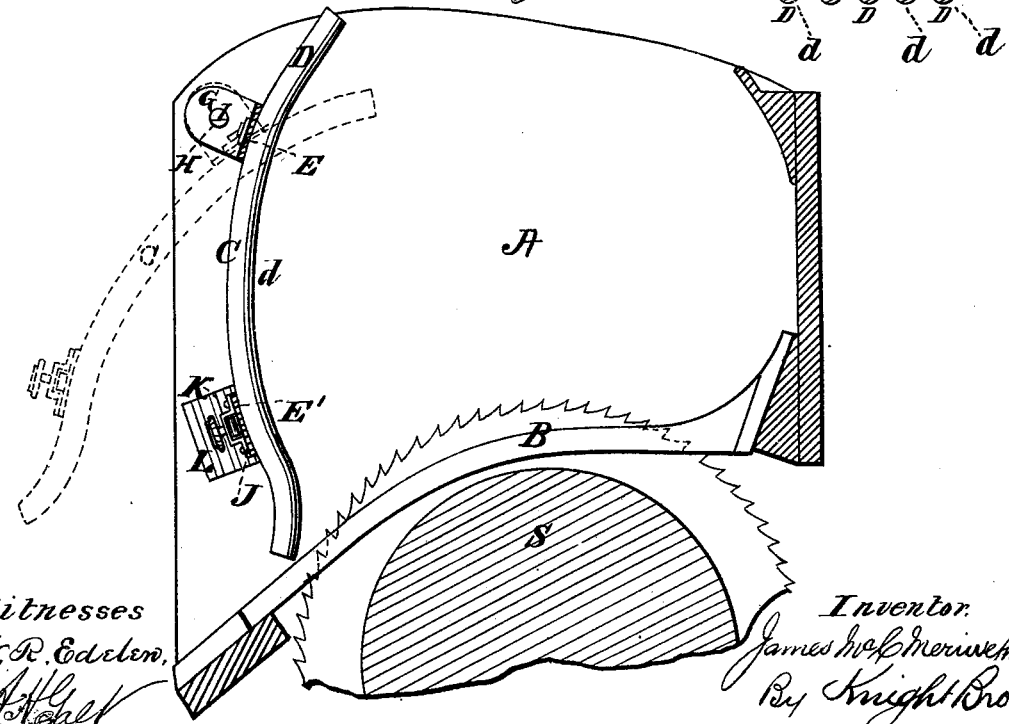

UNITED STATES PATENT OFFICE.

JAMES McCLURE MERIWETHER, OF GRAYSON, ARKANSAS.

IMPROVEMENT IN COTTON-GINS.

Specification forming part of Letters Patent No. 204,443, dated June 4, 1878; application filed September 28, 1877.

*To all whom it may concern:*

Be it known that I, JAMES MCCLURE MERIWETHER, of Grayson, in the county of Crittenden and State of Arkansas, have invented an Improved Rib-Breast for Cotton-Gins, of which the following is a specification:

My invention relates to an improved rib-breast for the seed-cotton chamber of a cotton gin.

My improvement consists, first, in constructing the breast with openings between the ribs for the seed to pass through, thus forming a grate to receive the pressure of the roll of cotton.

My improvement consists, secondly, in constructing the rear side of the ribs convex in cross-section, so that the seed may be guided away from the roll through the openings.

The object of my invention is to relieve the revolving roll of the denuded seed at any portion of the breast, so that it can escape without the necessity of passing down again, with the liability of getting in contact with the saws.

By constructing the breast in the manner described very little frictional surface will be presented to the roll in its revolutions within the chamber.

In the accompanying drawings, Figure 1 is a front view of my improved rib-breast as applied to a seed-cotton chamber, a portion being broken away to exhibit the saw-ribs. Fig. 2 is a vertical section on the line 2 2, Fig. 1, a forward position of the rib-breast being shown in dotted lines. Fig. 3 represents a horizontal section of a portion of the breast, showing the preferred form of rib.

The drawings show a portion of the front of a gin; and A may represent the seed-cotton chamber, having a ribbed and curved bottom, B, through which a saw-cylinder, S, operates to tear the cotton from the seed. The front end of the chamber A is provided with an open frame or breast, C, formed of vertical or nearly vertical ribs D, having convex sides $d$, and secured to cross-pieces E E′ by means of suitable rivets or bolts F.

The upper cross-piece, E, is formed with ears or lugs G, perforated at H, to engage with studs or pintles I inserted in the sides of the chamber. The lower cross-piece, E′, is provided with bolts J, which engage with perforations K in plates L, located on the sides of the chamber.

By constructing and applying the single breast in the manner described, the studs or pintles I form hinges for the breast to turn on, and the bolts secure the breast in different positions relatively to the saw-ribs.

When the bolts are withdrawn, the breast can assume a position such as is indicated in dotted lines in Fig. 2.

Instead of the cross-piece E′ having bolts, I may use a cross-piece similar to the upper one, E, having ears, so as to secure the breast permanently in one position by means of similar studs or pintles I.

In practice, the seed-cotton is placed in the chamber A, the cotton being torn from the seed by the saw-teeth, the seed escaping at once from the revolving roll of cotton through the openings $c$ of the rib-breast and out of the machine, instead of having to traverse almost the entire circuit before being discharged, thus lessening the friction in the said cotton-chamber by getting the seed entirely out of the way as soon as the cotton is removed, and consequently at the same time increasing the capacity of the gin.

The rear sides $d$ of the ribs D are preferably constructed convex in cross-section, so as to permit them to form guides or dividers to lead the seeds away from the roll.

The inner faces of the sides $d$ being narrow and smooth, present very little frictional surface to the roll.

By permitting the seeds to pass off immediately they are cleaned, they do not lie over the saws or bottom of the chamber and prevent the saws operating.

The chamber being clear of all obstructions, such as deflectors, there is no likelihood of the cotton getting matted.

Having thus described my invention, the following is what I claim as new and desire to secure by Letters Patent:

1. The open rib-breast C, in combination with a seed-cotton chamber, substantially as and for the purpose set forth.

2. An open breast, C c, constructed with ribs D, having convex rear portions d, as and for the purpose set forth.

3. The open rib-breast C, forming the front of the seed-cotton chamber, said chamber A having a grated bottom, B, for the saws to work through, substantially as and for the purpose set forth.

J. McC. MERIWETHER.

Witnesses:
JAMES B. COOK,
J. C. BERNARD.